United States Patent Office
2,846,326
Patented Aug. 5, 1958

2,846,326

REFRACTORY MANUFACTURE

Edward P. Pearson and Vaughn V. Hughey, Tiffin, Ohio, assignors to Basic, Incorporated, a corporation of Ohio No Drawing. Application August 23, 1954
Serial No. 451,690

7 Claims. (Cl. 106—60)

In the dead-burning of briquetted magnesian material in rotary kilns, some sort of primary bonding agent has been employed to hold the comminuted material in its briquette form through the kiln until sintering temperatures are attained, i. e. 2400–3000° F. The tendency is for many such agents to lose their effectiveness as the raw magnesium carbonate or hydroxide begins to lose its carbon dioxide or water of composition. By the present invention, a bonding may be attained which is particularly uniformly effective, and of which the costs are reasonable. Other objects and advantages will appear from the following description.

To the accomplishment of the foregoing and related ends, said invention, then, comprises the features hereinafter fully described and particularly pointed out in the claims, the following description setting forth in detail certain illustrative embodiments of the invention, these being indicative, however, of but a few of the various ways in which the principle of the invention may be employed.

Raw magnesian materials contemplated are in general those commonly used in manufacturing magnesia refractories, i. e., magnesite, brucite, magnesium hydroxide, etc. These raw materials may also include small amounts of so-called "burning agents," such as iron oxide, silica, serpentine, boron compounds, etc. that promote the high-temperature sintering of the product. With the magnesium material in desired state of comminution, there is also incorporated a small amount of available active magnesia, MgO. This may be derived from calcination of magnesium carbonate, or in some cases calcination of dolomite. In general, available active magnesia in an amount of 1.5–3 percent by weight of the dry briquette feed is satisfactory. For bonding reaction, furthermore, there is incorporated a few percent of a water-soluble iron salt, sulphate, chloride, or nitrate, ferrous or ferric. Amounts of this in the range of about 1 to 4 percent by weight of dry briquette feed is satisfactory. The iron salt is most conveniently introduced dissolved in the tempering water. The active magnesia is most conveniently introduced by dry mixing in the first instance.

The reaction product formed permits the use of much more coarsely sized particles than customary bonds. In fact, particle size as coarse as 8 mesh U. S. standard sieve are able to produce very strong briquettes. The coarseness of grind is therefore limited only by the requirements of the final high temperature reactions in the kiln whereby there is produced a dense dead-burned refractory of uniform composition throughout the burned briquette. Particle sizes passing a 50 mesh U. S. standard sieve have given very satisfactory refractory products, and any other particle sizing as desired may be used. The prepared mixture is then mixed with 4 to 6% tempering water conveniently containing the above-mentioned soluble iron bonding compound.

The prepared material is fed, after the tempering mixing, to a briquetting press. Conveniently this may be a roll-type briquetting press. The material is pressed at low to moderate pressures if desired to form a comparatively weak briquette, which at this stage is carefully moved, as by a chain conveyor belt dryer into a zone of elevated temperature to set and harden the briquettes. The size of the briquettes is not critical, however, a satisfactory shape in general is one that does not exceed 0.75" in at least one dimension, or larger briquettes may be pressed and be crushed to pass a 0.75" opening before subjection to the final calcining. The temperature range in the curing or setting operation is 450–650° F., the time being between 10 minutes for the higher temperatures and 20 minutes for the lower temperatures. The briquettes coming from this curing operation are notably strong, and can be dropped several feet onto bin surfaces without damage, and they may be conveyed by conveyors and be elevated by bucket elevators, and they can be fed to a rotary calcining kiln through a sloping feed pipe or by a snail feeder.

In the calcining-kiln operation, dust is carried off from a kiln by the sweep of the gases. Such dust, generally recovered by settling chambers, cyclone separators or electrostatic precipitators, consists essentially of partially calcined magnesian materials. We have found that such dust if added to the dry press feed either prior to or after grinding of the other ingredients, in the initial mixture for the briquettes, unexpectedly adds to the strength of the bond, and strongly promotes abrasion-resistance of the briquettes. We accordingly prefer to also incorporate such kiln dust when available as an ingredient of the bond mixture.

In instances where desired, lignin sulphate, as quite commonly used, may be added to the initial mixture for the briquetting. Such lignin compounds are the calcium or sodium or ammonium lignin sulphate, as commercially sold under such names as "Goulac," "Orzan," "Orzan A" and "Orzan S," etc. Such material promotes release of the briquettes from the press.

The following examples are illustrative:

I. 9.68 lbs. of crushed magnesite, 50 percent being −200 mesh, 0.15 lb. of finely divided active calcined magnesite, and 0.01 lb. of Goulac were dry mixed in a mechanical mixer. Then a solution of 0.17 lb of $FeSO_4 \cdot 4H_2O$ and 0.50 lb. of water was distributed through the dry mix, at room temperature. The material was pressed in a double roll briquetting press into almond-shaped briquettes, 1¼" x ⅞" x ⅝". The green briquettes were heated for 10 minutes, in three test lots, one at 450° F., another at 550° F. and the third at 650° F. On testing for strength, these three showed respectively 23.5, 8.3 and 17.4 strength units.

II. 9.82 lbs. of 50 percent −200 mesh magnesite, 0.08 lb. of finely divided active calcined magnesite, and 0.01 lb. of Goulac were dry-mixed and tempered with a solution of 0.10 lb. $FeSO_4 \cdot 7H_2O$ and 0.50 lb. of water. The tempered mix was pressed in a briquetting press and the briquettes were heated in two test lots at 450° F. and 550° F. for 20 minutes. The first showed a strength scale 5.1 units and the second 5.2 units.

III. 9.30 lbs. of 50 percent −200 mesh magnesite, 0.30 lb. of finely divided active calcined magnesite, and 0.01 lb. of Goulac were dry mixed and tempered with a solution of 0.40 lb. of copperas and 0.50 lb. of water. The tempered mix was pressed into 1¼" x ⅞" x ⅝" almond-shaped briquettes. The briquettes were heated in two lots at 450° F. and 550° F. and for different periods of time. The compression tests on these lots were as follows:

| Time | 10 Minutes | 20 Minutes | 30 Minutes |
|---|---|---|---|
| | Units | Units | Units |
| 450° F | 33.8 | 28.3 | 25.1 |
| 550° F | 15.0 | 12.0 | 13.5 |

IV. 9.71 lbs. of 50 percent —200 mesh magnesite and 0.15 lb. of active calcined magnesite were mixed and tempered with a solution of 0.14 lb. of ferric chloride and 0.50 lb. of water. The tempered mix was pressed into briquettes. The briquettes were heated at 450° F. for 30 minutes and by a crushing test in a hydraulic press showed 23.1 strength units.

V. 9.68 lbs. of 50 percent —200 mesh magnesite, 0.15 lb. of active calcined magnesite and 0.01 lb. of Goulac were dry mixed and tempered with a solution of 0.12 lb. of ferric sulphate and 0.50 lb. of water. The tempered mix was pressed in a rotary briquetting press into 1¼" x ⅞" x ⅝" almond-shaped briquettes. The green briquettes were heated in two lots at 450° F. and 550° F. respectively. On breakage tests, the compression units were found to be as follows:

| Time | 10 Minutes | 20 Minutes | 30 Minutes |
| --- | --- | --- | --- |
| 450° F | 4.2 | 8.1 | 9.7 |
| 550° F | 3.9 | 8.2 | 9.3 |

VI. 8.15 lbs. of —35 mesh magnesite, 1.50 lbs. of kiln stack dust and 0.15 lb. of active calcined magnesite were mixed, and a solution of 0.20 lb. of copperas and 0.60 lb. of water was blended in. The mix was briquetted as above, and briquettes were heated at 450° F. for 20 minutes. On test they showed 7.7 crushing units.

VII. 4.82 lbs. of —8 mesh magnesite, 0.15 lb. of calcined magnesite, and 4.82 lbs. of kiln stack dust were mixed and tempered with a solution of 0.20 lb. of copperas and 0.60 lb. of water. The tempered mix was briquetted. The briquettes, heated at 450° F. for 20 minutes, showed a test strength of 31.8 units.

The briquettes were also subjected to an abrasion test as follows: The briquettes were fired to a temperature of 2000° F. for one hour in a Globar furnace. After cooling, they were tumbled in a 17" fiber drum rotating at 60 R. P. H. for selected periods of time as indicated below, with hand-screening of the briquettes after each time period, the screens employed being 3, 14 and 48 mesh. Representative results of these tests were as follows:

*Screen analysis after tumbling*

| Duration of Tumbling | Ex. I | | | Ex. VI | | | Ex. VII | | |
| --- | --- | --- | --- | --- | --- | --- | --- | --- | --- |
| | 5 Mins. | 15 Mins. | 30 Mins. | 1 Hr. | 2 Hrs. | 4 Hrs. | 1 Hr. | 2 Hrs. | 4 Hrs. |
| | Percent | Percent | Percent | Percent | Percent | Percent | Percent | Percent | Percent |
| +3 Mesh | 81.7 | 68.4 | 59.6 | 69.7 | 60.7 | 54.9 | 93.3 | 91.3 | 91.0 |
| −3+14 | 2.2 | 2.5 | 2.7 | 4.5 | 5.9 | 6.0 | 3.4 | 4.7 | 4.8 |
| −14+48 | 0.5 | 0.7 | 0.7 | 4.0 | 5.5 | 5.4 | 0.9 | 1.1 | 1.3 |
| −48 | 15.6 | 28.4 | 37.0 | 21.8 | 27.9 | 33.7 | 2.4 | 2.9 | 2.9 |

Other modes of applying the principle of the invention may be employed, change being made as regards the details described, provided the features stated in any of the following claims or the equivalent of such be employed.

We therefore particularly point out and distinctly claim as our invention:

1. A method of physically bonding particles of a relatively chemically inactive magnesium compound selected from the group consisting of magnesite and brucite into briquette form comprising the steps of mixing particles of such a compound with a primary bonding agent consisting essentially of the reaction product of chemically active magnesia and an inorganic water soluble iron salt, said magnesia being present in an amount by weight of about 1.5 percent to 3 percent of the magnesium compound, and said iron salt being present in an amount by weight of about 1 percent to 4 percent of said compound, and causing said reaction product to adhere the particles of said compound one to another to impart mass integrity thereto.

2. A method of physically bonding particles of a relatively chemically inactive non-oxide magnesium compound selected from the group consisting of magnesite and brucite into briquette form adapted for subsequent sintering comprising the steps of mixing particles of such a magnesium compound with a magnesia primary bonding agent consisting essentially of magnesia in an amount by weight of about 1.5 percent to 3 percent of said particles and an inorganic water soluble iron salt in an amount by weight of about 1.5 percent to 3 percent of said particles together with a sufficient amount of water to form a moldable plastic mass, said magnesia being in a more finely divided particle size than said particles of magnesium compound, forming the mass into a briquette, and heating the formed briquette in the range of about 450° F. to about 650° F. to react the magnesia with the iron salt and bind said particles one to another with the resulting reaction product.

3. A method of binding a naturally occurring magnesium material selected from the group consisting of magnesite and brucite in briquette form and thereby eliminating preliminary refining steps comprising directly mixing particles of such a naturally occurring material with particles of a magnesia binder consisting essentially of magnesia in an amount by weight of about 1.5 percent to 3 percent of the ore and an inorganic water soluble iron salt in an amount by weight of about 1 percent to 4 percent of the ore together with a sufficient amount of water to form a moldable plastic mass, said magnesia binder particles being finer than the ore particles to migrate therebetween, forming the mass into a briquette, and heating the formed briquette in the range of about 450° F. to about 650° F. to react the magnesia with the iron salt and form a binder among the ore particles to adhere them one to another.

4. A method of binding a naturally occurring, non-oxide magnesium material selected from the group consisting of magnesite and brucite in briquette form until sintering temperatures are obtained and thereby eliminating preliminary refining steps for said material, comprising the steps of directly mixing an aggregate consisting of particles as coarse as 8 mesh U. S. Standard Sieve of such a naturally occurring material with finely divided particles of a magnesia binder consisting essentially of magnesia in an amount by weight of about 1.5 percent to 3 percent of the aggregate and an inorganic water soluble iron salt in an amount by weight of about 1 percent to 4 percent of the aggregate together with a sufficient amount of water to form a moldable plastic mass, said magnesia component of the binder being sufficiently chemically active to react with the iron salt, forming the mass into a briquette, and heating the formed briquette in the range of about 450° F. to about 650° F. to effect the magnesia-iron salt reaction and bond physically the aggregate particles one to another and impart mass integrity to the briquette.

5. A method as claimed in claim 4 wherein said inorganic water soluble iron salt is selected from the group consisting of ferrous sulphate, ferric sulphate, ferrous chloride, ferric chloride, ferrous nitrate, and ferric nitrate.

6. A method as claimed in claim 4 further including the step of sintering the briquette at an elevated temperature to produce a dead-burned product.

7. An intermediate briquetted product for use in making a dead-burned magnesian refractory from a naturally occurring magnesium ore selected from the group consisting of magnesite and brucite, such product comprising an aggregate of relatively coarse particles of a naturally occurring relatively chemically inactive magnesium ore, and a magnesia binder consisting essentially of the reaction product of magnesia and an inorganic water soluble iron salt, said magnesia being present in an amount by weight of about 1.5% to 3% and said iron salt being present in an amount by weight of about 1% to 4% of such ore, said magnesia binder being finely divided to be disposed between the larger ore particles and having sufficient chemical activity to react with said iron salt to form an adhesive binder effective to hold said particles together in the briquette form.

References Cited in the file of this patent

UNITED STATES PATENTS 1,444,527     Scharschu _____ Feb. 6, 1923